UNITED STATES PATENT OFFICE.

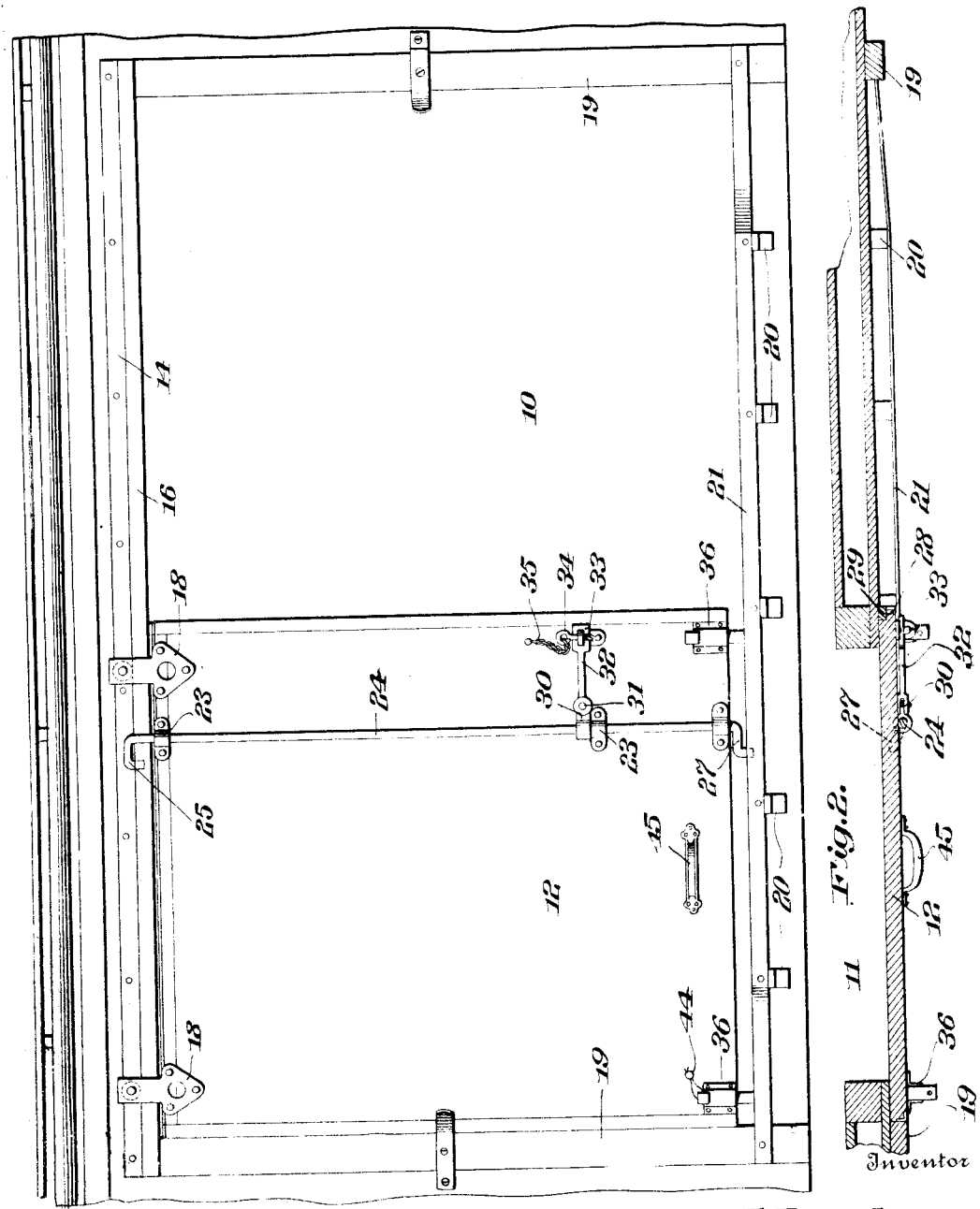

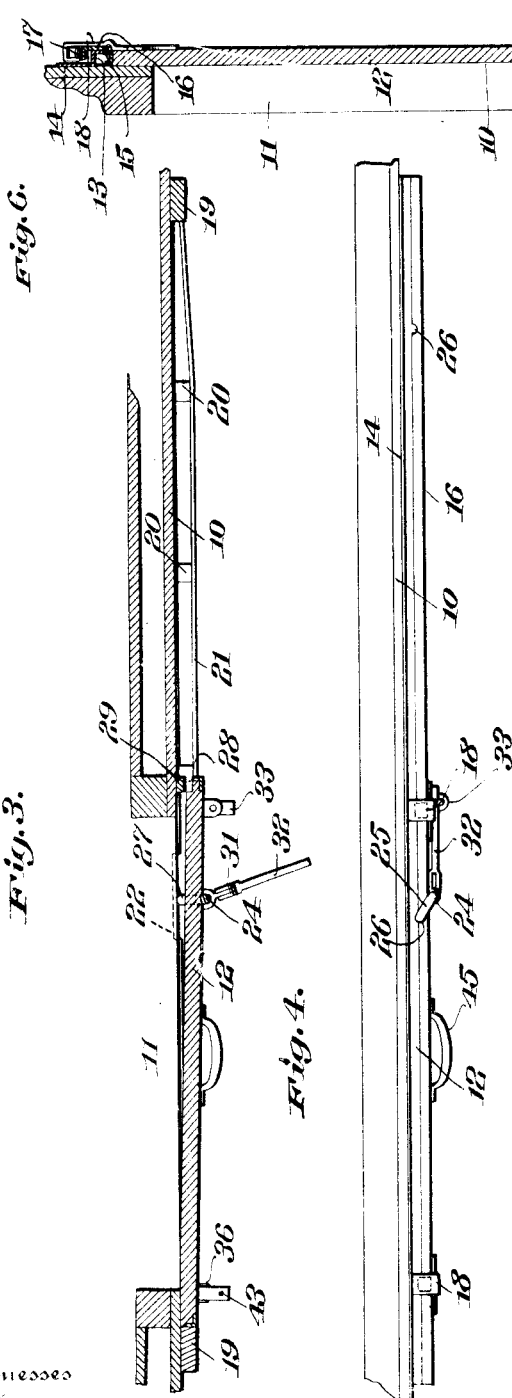

ERNEST E. LAUGHON, OF PORTSMOUTH, VIRGINIA, ASSIGNOR OF ONE-THIRD TO JAMES T. JARRETT, OF PORTSMOUTH, VIRGINIA.

CAR-DOOR.

1,113,792. Specification of Letters Patent. Patented Oct. 13, 1914.

Application filed September 9, 1913. Serial No. 788,864.

*To all whom it may concern:*

Be it known that I, ERNEST E. LAUGHON, a citizen of the United States, residing at Portsmouth, in the county of Norfolk and State of Virginia, have invented new and useful Improvements in Car-Doors, of which the following is a specification.

The invention relates to car doors, and more particularly to the class of car door fasteners.

The primary object of the invention is the provision of a device of this character wherein the car door is supported upon sliding hangers which allow the door to be released from the side of the car when opening and closing the same.

Another object of the invention is the provision of a device of this character wherein the door when closed will be firmly locked so as to render it burglar-proof, as the car seals have to be broken before the parts of the device can be operated for the opening of the door.

A further object of the invention is the provision of a device of this character wherein the latches on the door can be sealed by employing the usual car seals and on the releasing of the same the door can be moved outwardly from the side of the car to permit the free sliding movement thereof for the opening and closing of the said door.

A still further object of the invention is the provision of a car door wherein the same is rendered burglar-proof, spark-proof, and water-proof.

A still further object of the invention is the provision of a car door which is simple in construction, thoroughly reliable and efficient in its purposes, and inexpensive in manufacture.

With these and other objects in view, the invention consists in the construction, combination and arrangement of parts as will be hereinafter fully described, illustrated in the accompanying drawing, and pointed out in the claims hereunto appended.

In the drawings:— Figure 1 is a fragmentary side elevation of a car showing the door and fastener constructed in accordance with the invention, the door being closed. Fig. 2 is a horizontal transverse sectional view thereof, showing the door closed. Fig. 3 is a similar view, showing the door in position to be opened. Fig. 4 is a top plan view showing the door closed. Fig. 5 is a similar view, showing the double position for opening. Fig. 6 is a vertical transverse sectional view through the car.

Similar reference characters indicate corresponding parts throughout the several views in the drawings.

Referring to the drawings by numerals, 10 designates a portion of a car, in the side wall of which is formed the usual doorway 11 adapted to be opened and closed on moving the sliding door 12 above which is mounted a guide track which is formed with a horizontal intermediate portion 13, an upstanding vertical portion 14, and a depending vertical portion 15, the portion 14 being fastened to the side wall of the car 10 above the doorway in any suitable manner, while fixed to the depending vertical portion 15 is an inverted substantially L-shaped plate 16, the in-turned portion of which is slightly elevated above the horizontal portion 13 and on which travels the rollers 17 journaled in door hangers 18 which are fixed to the door 12 so that the same can be moved to open or closed position. Fixed to the side wall of the car 10 at opposite sides of the doorway the desired distance apart are stop cleats 19 which limit the sliding movement of the door 12 when being opened and closed.

Below the doorway 11 at suitable intervals apart and secured to the side wall of the car 10 are brackets 20 to which is fixed a bottom door guide 21 which is outwardly bowed for a greater portion of its length, while secured to the outer face of the side wall of the car rearwardly of the guide 21 is a door chafing strip 22, the same being coextensive with a greater portion of the length of the strip 21 and prevents the wearing away of the side wall of the car during the working of the door.

Mounted on the outer face of the door 12 are vertically alining strap bearings 23 in which is journaled a turning rock shaft 24 formed with a hooked upper end 25 extended above the upper edge of the door and over the track for engagement in notches 26 formed in the in-turned portion of the plate 16, it being seen that when the rock shaft 24 is turned in one direction the hook 25 will engage in either of the notches 26 for locking the door closed or opened. The other or lower end of the rock shaft 24 is formed with a crank 27 which is designed to act against the chafing strip 22 so as to move the door outwardly from the side wall of the car for a purpose presently described.

The door 12 at one edge is formed with a rabbet or groove 28 adapted to receive a strip 29 which is fixed to the side wall of the car vertically thereof at one side of the doorway 11 therein, and when the strip 29 is engaged in the groove or rabbet 28 the door is held against sliding movement. Now, on turning the rock shaft 24 in one direction the crank 27 will move the door outwardly from the side wall of the car, this disengaging the door from the strip 29 and permitting it to pass the latter when being shifted to open position. Also on this movement of the rock shaft 24 the hook end 25 is disengaged from the notch 26 in the strip 16, thus unlocking the door to permit the free sliding of the same to open position.

Formed on the rock shaft 24 is an eye 30 to which is pivoted at 31 a swinging hasp 32 which is adapted to engage with a keeper 33 mounted on the door 12, and adapted to be connected to this keeper after the engagement of the hasp 32 therewith is a locking pin 34 which is carried upon a flexible chain 35 suitably mounted upon the door.

Fixed to the outer face of the door 12 at the lower edge thereof are spaced latch guide members 36 in which are slidably fitted the shank 37 of latch members having right angular shoes 38 at their lower ends, the shoes being formed with stepped shoulders 39 and 40 respectively, which are adapted to co-act with the guide strip 21 for engaging the same to limit the outward movement of the door 12 when the rock shaft 24 is turned. The upper ends of the shanks 37 of the catches are formed with out-turned extensions 41, while formed on the members 36 at their upper ends are out-turned wings 42, the latter and the said extensions 41 being formed with alining openings 43 through which is adapted to be passed the band portions of car seals 44 for the fastening of the catches, the shanks 37 of the catches being of greater length than the guide members 36 so as to permit the raising of the catches for unlatching the door to permit the outward movement thereof to disengage it from the strip 29 so that the door will freely pass the same for the opening or closing thereof. Normally the door rests against the side wall of the car 10 and the strip 29 is engaged in the groove 28, and when the door is in this position the catches are lowered so that the shoulders 39 engage with the guide 21, thus locking the said door against outward movement and as heretofore stated the car sills serve to fasten the catches to prevent the releasing of the same to permit the opening or closing of the door. Mounted on the door is a loop handle 45 which permits the sliding of the door or pulling of the same outwardly from the side wall of the car when the catches are raised for unlatching the door.

It will be apparent that when the door is closed and the strip 29 engages in the groove therein, rain, snow or sleet cannot enter the interior of the car through the doorway. Assuming that the door has been closed and locked and it is desired to open the same, the hasp is disengaged from the keeper, and thereafter one of the catches is unfastened and raised so that the shoulder 39 thereof will be elevated above the bowed portion of the guide 21. Now, on turning the rock shaft 24 in one direction the hook end 25 is disengaged from the notch 26 and the crank 27 acts to swing the door outwardly from the side wall of the car 10, thus disengaging the door 12 from the strip 29 and positioning the said door so as to pass the strip on the opening thereof. The shoe or catch member just referred to will ride upon the bowed portions of the strip 21 whereupon on opening the door to its fullest extent the other catch member will drop into engagement with the strip 21 so that its shoulder 39 will lock the door against outward swinging movement, the door in this instance being moved inwardly against the side of the car 10 so that the strip 29 will engage therewith and prevent the sliding of the same. Also when the door is opened the hook 25 will engage the other notch 26, thus locking the door.

From the foregoing it is thought that the construction and manner of operation of the device will be clearly understood, and therefore a more extended explanation has been omitted.

What is claimed is:—

1. The combination with a door frame having stop cleats at opposite sides thereof, of a guide track mounted above the door frame and having a horizontal intermediate portion, an upstanding vertical portion and a depending vertical portion, an inverted substantially L-shaped plate fixed to the depending vertical portion of the track and having an inturned portion slightly elevated above the horizontal portion of said track, the said inturned portion of the plate being formed at intervals with notches, a door adapted to fit between the stop cleats, hangers fixed to the door and movably supported on the L-shaped plate, bearings carried by the door, a guard rail fixed below the door frame parallel with the track, a rock shaft journaled in the bearings and having crank terminals, one crank terminal being in the form of a hook straddling the L-shaped plate and adapted to engage in the notches in the inturned portion thereof, the other crank terminal being engageable with the guide rail, and an arm carried by the rock shaft for turning the same to swing the crank terminals whereby the door will be moved into engagement with or out of engagement from the stop cleats.

2. The combination with a door frame having stop cleats at opposite sides thereof, of a guide track mounted above the door frame and having a horizontal intermediate portion, an upstanding vertical portion and a depending vertical portion, an inverted substantially L-shaped plate fixed to the depending vertical portion of the track and having an inturned portion slightly elevated above the horizontal portion of said track, the said inturned portion of the plate being formed at intervals with notches, a door adapted to fit between the stop cleats, hangers fixed to the door and movably supported on the L-shaped plate, bearings carried by the door, a guard rail fixed below the door frame parallel with the track, a rock shaft journaled in the bearings and having crank terminals, one crank terminal being in the form of a hook straddling the L-shaped plate and adapted to engage in the notches in the inturned portion thereof, the other crank terminal being engageable with the guide rail, an arm carried by the rock shaft for turning the same to swing the crank terminals whereby the door will be moved into engagement with or out of engagement from the stop cleats, and a keeper on the door and engaged by the arm whereby the shaft can be locked against turning movement.

In testimony whereof I affix my signature in presence of two witnesses.

ERNEST E. LAUGHON.

Witnesses:
M. R. REID,
H. J. MADDREY.